W. MARTINSON.
DRIVING AXLE MECHANISM FOR ROAD WHEELS OF MOTOR VEHICLES.
APPLICATION FILED DEC. 31, 1919.

1,367,616.

Patented Feb. 8, 1921.

Witness:
Harry S. Gaither

INVENTOR
William Martinson.
By Chamberlin & Brendenreich
ATTORNEYS:

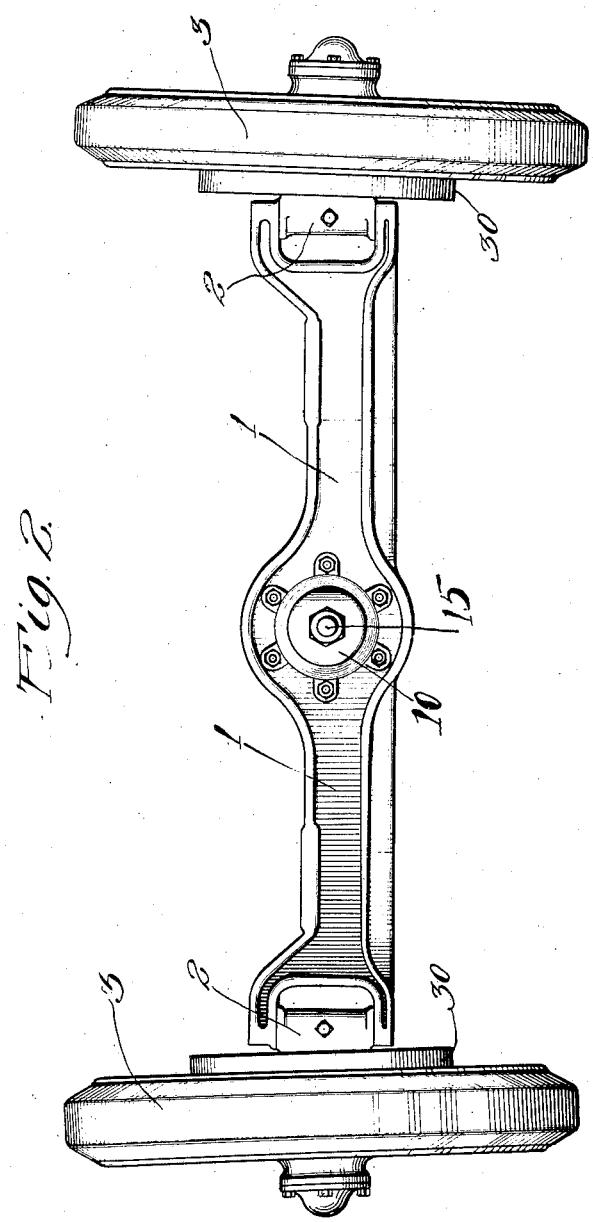

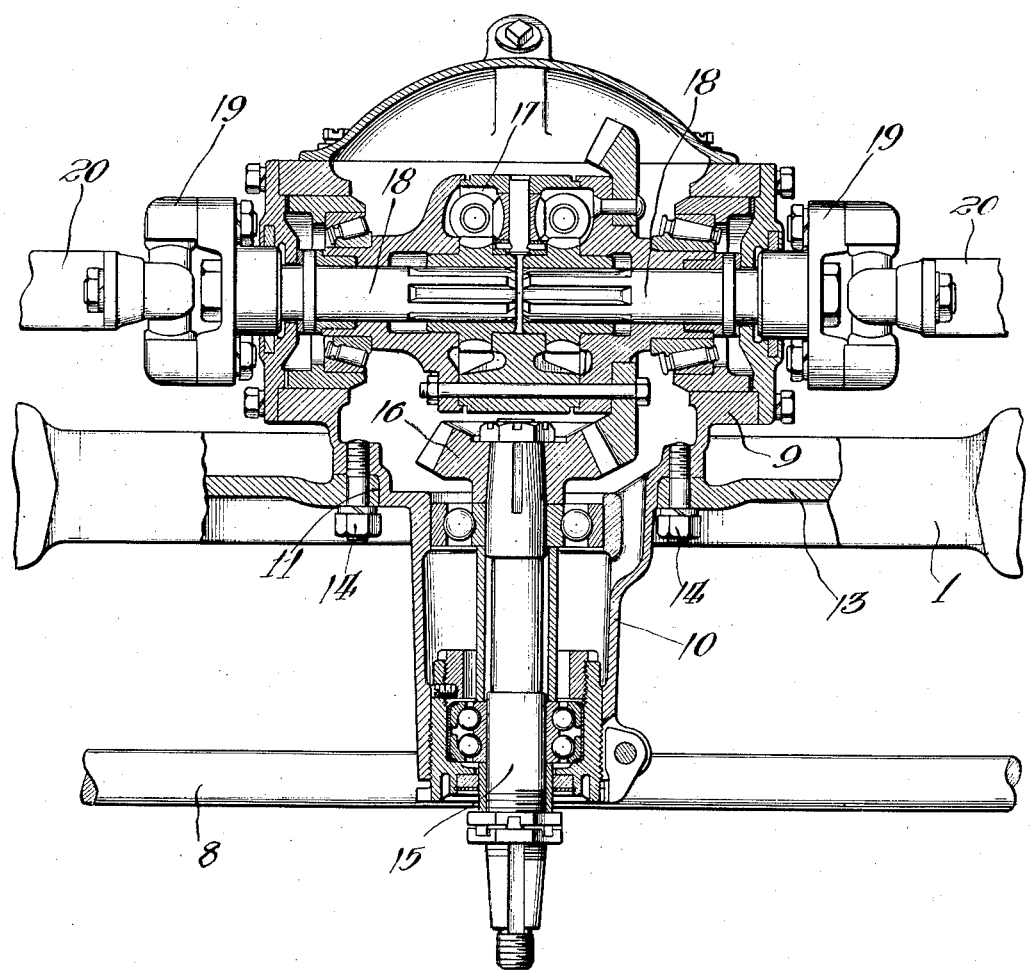

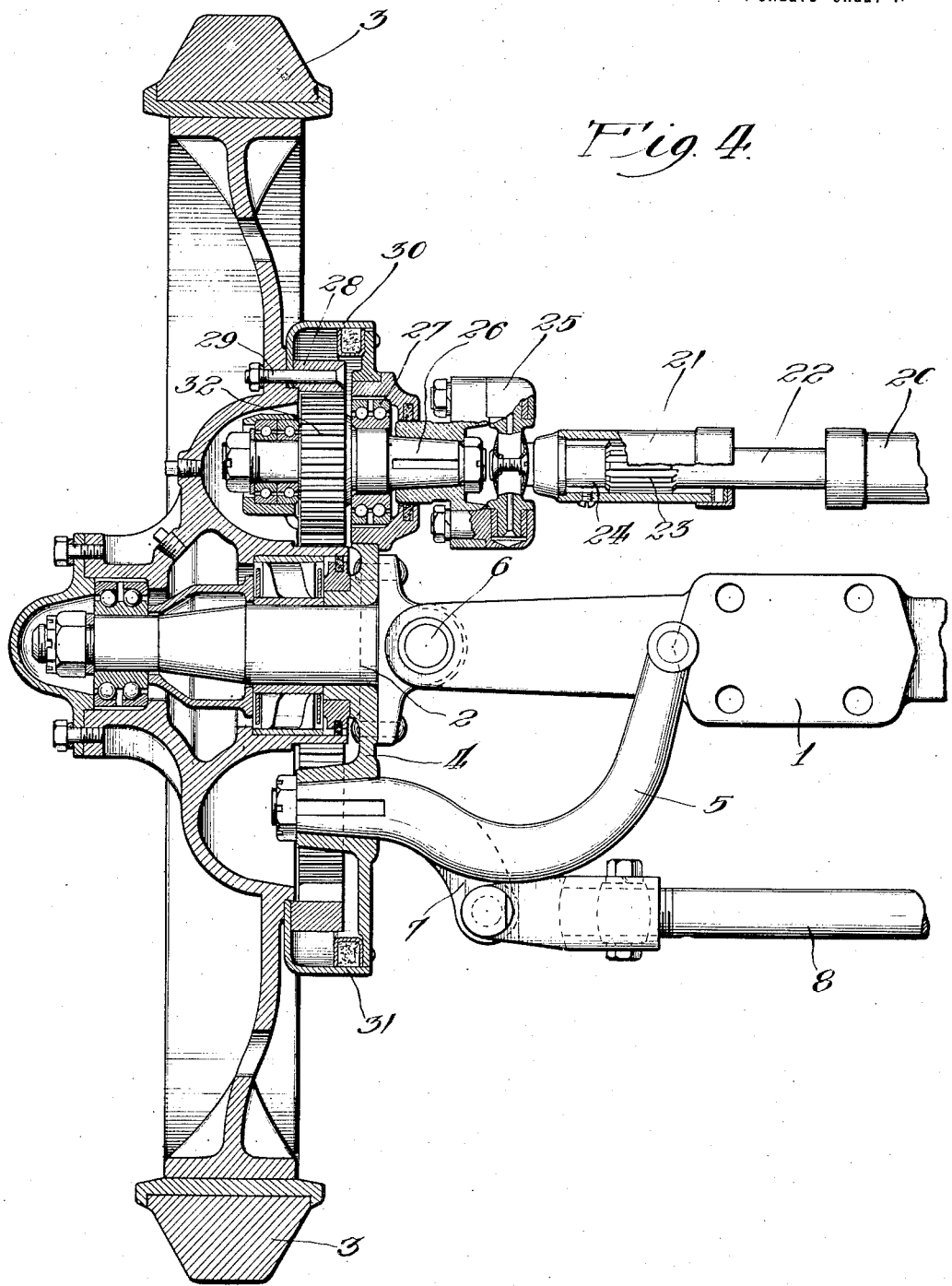

UNITED STATES PATENT OFFICE.

WILLIAM MARTINSON, OF KENOSHA, WISCONSIN, ASSIGNOR OF ONE-HALF TO HENRY P. LUNDSKOW, OF KENOSHA, WISCONSIN.

DRIVING-AXLE MECHANISM FOR ROAD-WHEELS OF MOTOR-VEHICLES.

1,367,616. Specification of Letters Patent. Patented Feb. 8, 1921.

Application filed December 31, 1919. Serial No. 348,610.

*To all whom it may concern:*

Be it known that I, WILLIAM MARTINSON, a citizen of the United States, residing at Kenosha, county of Kenosha, State of Wisconsin, have invented a certain new and useful Improvement in Driving-Axle Mechanism for Road-Wheels of Motor-Vehicles, and declare the following to be a full, clear, and exact description of the same, such as will enable others skilled in the art to which it pertains to make and use the same, reference being had to the accompanying drawings, which form a part of this specification.

My invention has for its object to produce a simple, novel and efficient axle construction including means for driving the corresponding road wheels particularly adapted for but not limited in its application to so-called four-wheel drives for automobile trucks.

Considered in one of its aspects, my invention may be said to have for its object to produce a driving axle in which the driving mechanism is associated with the load-carrying member of the axle in such a way that the driving mechanism may be removed without eliminating any of the functions of the axle mechanism except that of driving so that, in the case of removal of the driving mechanism from the front axle, for example, a vehicle may be transformed into a two-wheel drive without necessitating any change either to insure a proper wheeled support or the capacity for steering from the front wheels.

Viewed in another of its aspects my invention may be said to have for its object to produce a simple and novel driving axle in which the axis of the driving member lies in approximately the same horizontal plane as the axis of the load-carrying member of the axle and, in the case of the front axle of the vehicle, may lie in front of the latter axis.

Viewed in another of its aspects, my invention may be said to have for its object to produce a simple and novel axle construction in which the differential housing or live center is rigidly fastened to the load-carrying member of the axle in such a way as to confine the height of the structure as a whole to the height of such housing and thus afford a maximum clearance below the axle structure and a mimium elevation of the top of the axle structure above the axis of the road wheels.

The various features of novelty whereby my invention is characterized will hereinafter be pointed out with particularity in the claims; but, for a full understanding of my invention and of its objects and advantages, reference may be had to the following detailed description taken in connection with the accompanying drawings, wherein:

Fig. 2 is a rear elevation of the mechanism shown in Fig. 1;

Fig. 3 is an axial horizontal section, on an enlarged scale, through the middle portion of the axle, including the live center; and Fig. 4 is a section on the same plane as Fig. 3 taken through one of the road wheels and the adjacent parts of the axle mechanism.

Figure 1:
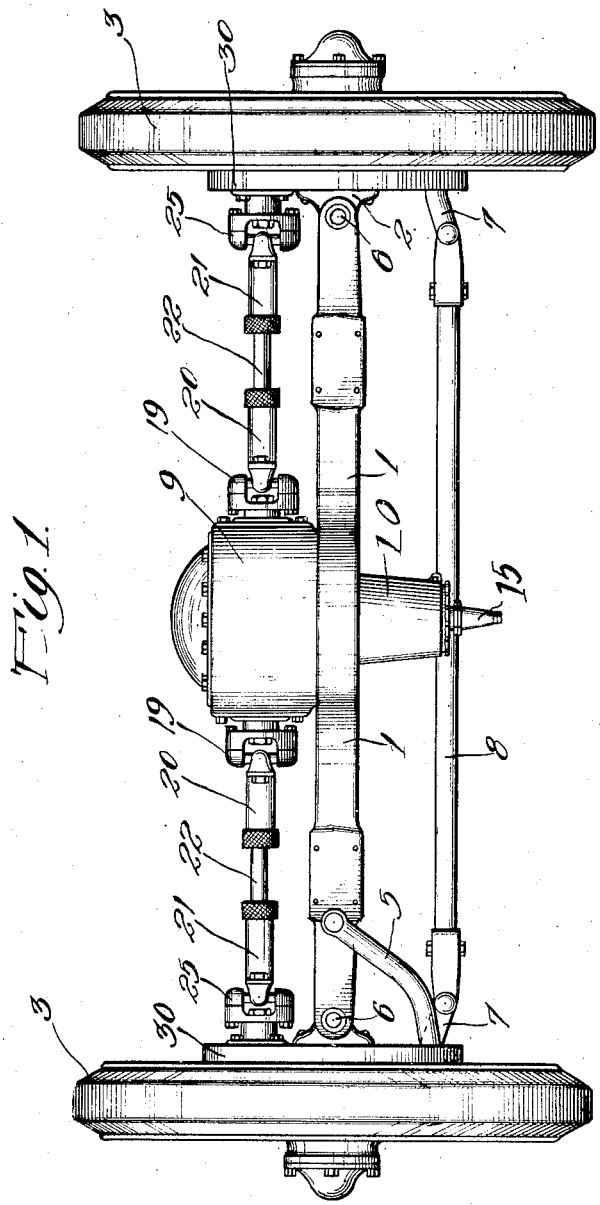
Figure 1 is a top plan view of a wheeled axle embodying my invention and designed for use as the front axle of a four-wheel drive.

Referring to the drawing, 1 represents an axle member designed for load-carrying purposes having at the ends swiveled sections, 2, 2, on which the road wheels, 3, 3, are mounted as is usual in front axle construction. As best shown in Fig. 4, each of the axle sections, 2, has bolted thereto a heavy circular plate or disk, 4, to one of which is attached a steering arm, 5. When the steering arm is moved it causes the corresponding axle section, 2, to swing about its vertical pivot, 6. Each of the disks or plates, 4, is also provided with a projecting part or lug, 7, between which elements extends a tie rod, 8, which causes the two wheels to move in unison for steering purposes. The differential or live center of the driving mechanism is contained in a housing, 9, having a hollow neck or shank, 10, which extends through an opening, 11, located midway between the ends of the load-carrying axle member, 1. The member 1 is preferably made of I section increased sufficiently in depth at the middle so that the opening, 11, lies wholly in the web portion of the axle. The housing is accurately finished at the base of the neck portion, 10, so as to provide an annular bearing surface which will fit against the web, 13, of the member 1 and be rigidly fastened thereto by suitable bolts or studs, 14, as best shown in Fig. 3. The housing lies on the front side of the axle while the part 10 thereof lies at the rear. Driving power is delivered through a shaft, 15, revolubly supported in the member 10 of the housing and having at its inner end a bevel pinion, 16, which transmits power through any usual or suitable differential device, 17, to two live axles, 18, 18, arranged end to end and extending at right angles to the shaft, 15, and parallel with the load-carrying axle member, 1. The outer ends of the live axle members, 18, 18, are carried through the sides of the housing and are there connected by means of suitable universal joints, 19, to live axle sections adapted to lengthen and shorten as the wheels shift their positions in steering. Each of these latter live axle sections is made up of two similar oppositely-disposed thimbles or sleeves, 20 and 21, spaced apart from each other and connected together by a floating shaft section, 22, which is interlocked with its two sleeves or thimbles so as to be rotatable therewith while leaving freedom for relative movements in the axial direction. In the arrangement shown, as best seen in Fig. 4, the ends of each of the members 22 are provided with elongated longitudinally-extending teeth, 23, meshing with complementary teeth or ribs, 24, within the sleeves. Consequently each unit made up of thimbles or sleeves, 20 and 21, and shaft section, 22, acts as a single rigid member under torsional stresses and as three independently movable pieces under stresses in the axial direction. The members 21 are connected by suitable universal joints, 25, to the final elements, 26, of the live axle; the members 26, as best shown in Fig. 4, being revolubly supported in suitable bearings, 27, in the plates or disks, 4, to which reference has heretofore been made. These plates or disks are spaced apart a short distance from the corresponding road wheels so as to leave room between each disk and the adjacent road wheel for an internal gear, 28, fastened to the road wheel by bolts, 29, or otherwise. These same bolts may be used to fasten to the wheel a cylindrical housing, 30, surrounding the corresponding member, 4; each of the members 4 being provided with a suitable packing ring, 31, which engages with the inner surface of the surrounding housing and forms a dust-proof joint while permitting the housing to revolve freely about the disk. Each of the axle members, 26, is provided with a pinion, 32, meshing with the corresponding internal gear so that when the pinions are revolved the road wheels will be rotated thereby through the internal gears.

It will be seen that the driving member of the axle is entirely independent of the load-carrying member except that it is supported thereby through the attachment of the housing for the differential or live center to the middle point of the load-carrying member; and it will also be seen that the driving member of the axle is entirely independent of the steering means, simply adjusting itself to compensate for changed conditions as the wheels are shifted in the process of steering. Consequently, if desired, the entire driving mechanism illustrated may be removed and leave a simple front axle construction with its proper steering means. It will also be seen that the location of the driving mechanism and its construction renders it very accessible and easy to take apart for inspection or repairs. It will further be seen that by placing the driving mechanism in front of the load-carrying member, desirable space in rear of the latter is preserved for other purposes and that by placing it on the same level as the load-carrying member the greatest amount of clearance below the axle structure, combined with a minimum elevation of the top of the axle structure is obtained.

While I have illustrated and described with particularity only a single preferred form of my invention, I do not desire to be limited to the exact structural details thus illustrated and described; but intend to cover all forms and arrangements which come within the terms employed in the definitions of my invention constituting the appended claims.

I claim:

1. The combination with a wheeled front load-carrying axle of a vehicle, of a driving axle lying in front of and in approximately the same horizontal plane as the aforesaid axle, driving mechanism between the ends of the driving axle and the wheels on the other axle, a housing carried at the middle of the load-carrying axle for supporting the driving axle, a driving shaft in said housing extending rearwardly through the load-carrying axle, and an independent cross connection between said wheels lying behind the load-carrying axle.

2. The combination with a wheeled front load-carrying axle of a vehicle, of a housing fixed on the front side of said load-carrying axle, a differential mechanism in said housing, a driving shaft for said mechanism extending rearwardly through said load-carrying axle, driving mechanism between the wheels on said axle and said differential mechanism and including detachable driving axle sections, and an independent cross connection between said wheels lying behind the load-carrying axle.

In testimony whereof, I sign this specification.

WILLIAM MARTINSON.